(12) United States Patent
Boehm et al.

(10) Patent No.: US 6,760,839 B2
(45) Date of Patent: Jul. 6, 2004

(54) AUTOMATIC APPLICATION RESTART IN AN EMBEDDED ENVIRONMENT

(75) Inventors: Janko Boehm, Ehningen (DE); Herwig Gustav Elfering, Baden-Baden (DE); Thomas Hess, Bad Liebenzell (DE); Daniel Metz, Muggensturm (DE)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 10/016,999

(22) Filed: Dec. 14, 2001

(65) Prior Publication Data

US 2002/0083230 A1 Jun. 27, 2002

(30) Foreign Application Priority Data

Dec. 15, 2000 (EP) .............................................. 00127577

(51) Int. Cl.[7] .............................................. G06F 13/08
(52) U.S. Cl. .............................. 713/2; 713/100; 710/10; 710/104
(58) Field of Search ........................ 710/8–19, 104–105; 713/1–3, 100; 714/5–6

(56) References Cited

U.S. PATENT DOCUMENTS

| 6,038,680 A | * | 3/2000 | Olarig ............................. 714/6 |
| 6,332,198 B1 | * | 12/2001 | Simons et al. .................. 714/6 |
| 6,505,281 B1 | * | 1/2003 | Sherry .......................... 711/168 |
| 6,539,472 B1 | * | 3/2003 | Fujishima ....................... 713/2 |
| 6,681,339 B2 | * | 1/2004 | McKean et al. ................ 714/5 |
| 6,681,390 B2 | * | 1/2004 | Fiske .......................... 717/173 |

FOREIGN PATENT DOCUMENTS

| EP | 1215576 A2 * | 6/2002 | ........... G06F/11/14 |

* cited by examiner

Primary Examiner—Christopher B. Shin
(74) Attorney, Agent, or Firm—Douglas W. Cameron; Anne Vachon Dougherty

(57) ABSTRACT

A method and system for operating an input/output circuit for driving peripheral devices controlled by an embedded system. For increasing the overall system availability the invention proposes to add some limited, repeatedly-performed status storing functionality preferably into a register storage of the I/O devices. The stored information can be easily exploited (i.e., read out from external of the input/output devices) via the controller of the embedded system.

9 Claims, 4 Drawing Sheets

INVENTIONAL

AUTOMATIC APPLICATION RESTART IN AN EMBEDDED ENVIRONMENT

FIELD OF THE INVENTION

The present invention relates to improvements of system availability of networked computer systems. In particular, it relates to method and system for operating an input/output circuit for driving peripheral devices within an embedded system.

BACKGROUND OF THE INVENTION

The present invention is generally applicable in computer networks comprising a plurality of computers. Particular additional advantages can be taken of it when said plurality of computers has some inner structure of 'competence distribution' exist, in particular a structure in which a first type of server computers and a second type of more or less dedicated control computer, in particular embedded controllers, exist which have only a reduced technical equipment, as e.g., no hard disk, or display unit, or keyboard, etc.

Although the present invention has a very broad scope implied by its inherent technical abstractness it will be discussed in here with reference to a larger enterprise computer network which is schematically depicted in FIG. 1.

Such a multi-server/multi-user networked environment comprises a huge number of peripheral devices 36, e.g. terminals, printers, storage devices, sensors, actuators and the like, which are connected with and controlled by a server cluster 10 having a plurality of CPUs 11, a memory controller 22 cooperating with a cache device 14 and a plurality of memory cards 12 via a respective system bus or a adapted switching device.

To supervise the communication between said server cluster 10 (left) and said peripheral devices 36 (right), so called embedded systems 18 are used to sense and control the so-called Input/Output devices 26 e.g., so-called I/O cards. These embedded systems are hosted on the so-called power/controller cards 18 and are dedicated computing units, for example a so-called Power PC which is used without the usual man/machine interface.

For the purpose of version consistency required for operating the peripheral devices 36 without major problems as well as for cost reasons neither said I/O cards 26 nor embedded controllers 18 do possess an own persistent software storage, like a hard disk, in which multiple versions of a software could be stored and executed.

Instead, and with additional reference to FIG. 2, a more detailed, schematic representation of a prior art I/O card is given. There is provided a controller interface 9 connecting to an ASIC chip 28 in which the control logic is implemented for controlling the operation of the individual drive devices 42, 32 for driving the peripheral devices. In an example depicted in FIG. 2, this is an electrical-to-optical and vice versa, Signal Converter 42 cooperating with a plurality of optical device drivers 32. Thus, said system comprises a controller means 22 and an input/output circuit (26) with an ASIC 28 and sensor response means 32 for driving said device 42.

Further, a clock 41 is provided for supplying said converter and the ASIC with a respective clock signal.

Via the functional interface 14 the operational signals are transferred which are required to use the peripheral devices.

Via said controller interface the ASIC 28, the so-called FGA, receives data signals and a clock signal. This implementation allows to even communicate with the FGA (ASIC) 28 when the clock on the card is defective or powerless due to a short somewhere on the card. In this case the sense and control lines of the FGA can still be used to identify the root cause of the problem.

In order to focus now on the disadvantages of prior art, the system availability in computer system environments like those described above is addressed now in more detail:

Although, a variety of efforts is made to absolutely minimize the duration where a computer system environment or a subsystem is not able to perform its task due to a software or a hardware failure, e.g., redundant controllers, redundant peripheral devices, driver code runs in only one, unique version, etc., the system availability is not sufficiently provided yet in prior art.

From other computer system environments that have real-time requirements, and wherein consequently the system availability is extremely important, various techniques like keeping persistent states, trace points, etc., are known to improve system availability.

This, however, is not applicable to the embedded systems due to the specific hardware configuration of said embedded systems, and the intended absence of e.g., a hard disk and a respective tracing logic in the I/O card itself.

It would be desirable to apply such techniques like keeping persistent states, trace points, etc. to other computer system environments or subsystems as well, for example to profit from them in the above mentioned embedded systems in order to increase their system availability.

It is thus an object of the present invention to improve the system availability in an environment comprising embedded systems.

SUMMARY OF THE INVENTION

The foregoing and other objects are achieved by the present invention comprising a method and system for operating an input/output circuit for driving peripheral devices controlled by an embedded system. For increasing the overall system availability the invention proposes to add some limited repeatedly performed status storing functionality preferably into a register storage of the I/O devices. The information can be easily exploited, (i.e., read out from external of the input/output devices) via the controller of the embedded system.

Said additional logic "add-on", which is for example implemented in an ASIC in the embedded system, repeatedly generates status information reflecting the status of an associated input/output device, continuously stores said status information in an input/output storing means, for example, in a register included in said ASIC, and keeps said status information available to be requested by a controller communicating with the ASIC logic in the input/output circuit.

Said regular storing of status information then enables the controller, for example in case of a controller reboot or when a redundantly provided controller takes over the job of a first controller which had a breakdown before, to initiate a helpful response to be issued by a sensor response means. For example the response will be from an Optical-to-Electrical signal converter, in a case when an optical peripheral device is to be operated or when a fibre-optic signal transmission is performed by said converter.

The helpfulness for the purposes of improved system availability is that said response reflects the current drive status of said exemplary converter device.

Thus when the controller software reads the (current) status information from said input/output storage means of said input/output circuit, it is enabled to comparing said response with the stored status information. Thus the controller is enabled to continue the operation of said sensor response means dependent of the compare result.

When for example, the freshly sensed status is the same as that one read out from the register, then the rebooted controller or the stand-by redundant controller can continue operation without restarting/rebooting/reinitializing the sensor response circuit which in the worst case would terminate a running communication between server and peripheral devises.

By the foregoing implementation, time is saved and the system availability is increased. The solution profits from the fact that it is possible for the operating system, and thus for the controller, to read and write the I/O address space. Thus an I/O register or the like can be used as a normal RAM for storing said important status information.

Advantageously, a register is used for storing the status information, because a power drop then has the same effect on the register content as on the current sense information at the sensor response device, (i.e., such that there is no defined status which can be relied on) and thus the logical conclusion that a restart of the device is required is easy and error-free to reach.

Advantageously, a cold-start indicator flag is additionally provided which is comprised of said status information. This flag can be evaluated by the controller in the above situation prior to any other information. When the flag is 'on', then the controller must initialize the dependent device. In this single case a reboot of the device is required.

The present invention is thus advantageously applicable when increased system availability—nearly permanent—of the components is required. This is in particular the case in the above-mentioned type of systems when the controllers are configured redundantly.

BRIEF DESCRIPTION OF THE DRAWINGS

The present invention is illustrated by way of example and is not limited by the shape of the figures of the accompanying drawings in which.

DESCRIPTION OF THE PREFERRED EMBODIMENT

Figure 1:
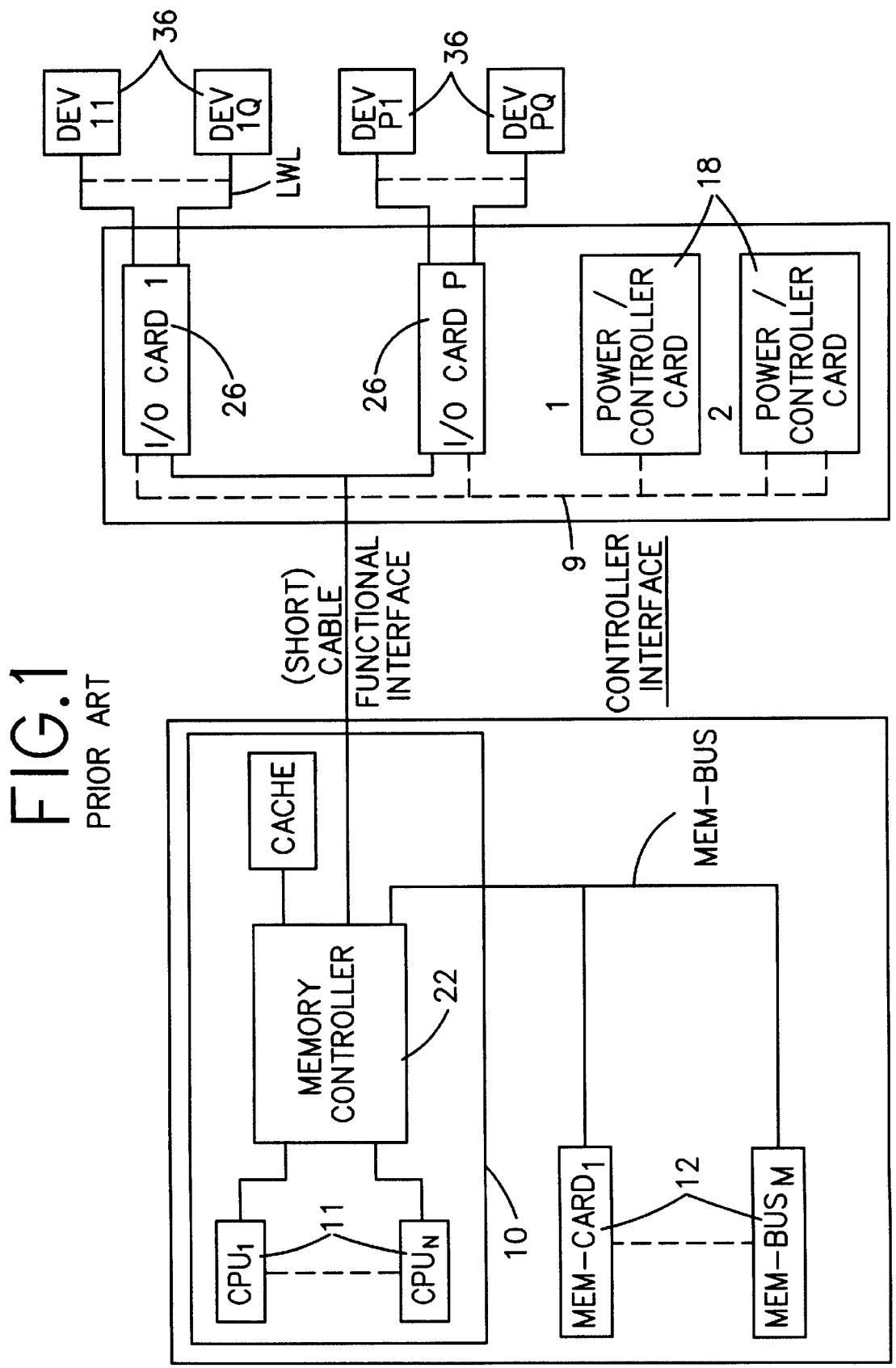
FIG. 1 is a schematic block diagram showing the most essential elements used in the environment of a clustered server area communicating with a prior art an I/O circuit system, survived by an embedded control system, for operating peripheral devices.
Figure 2:
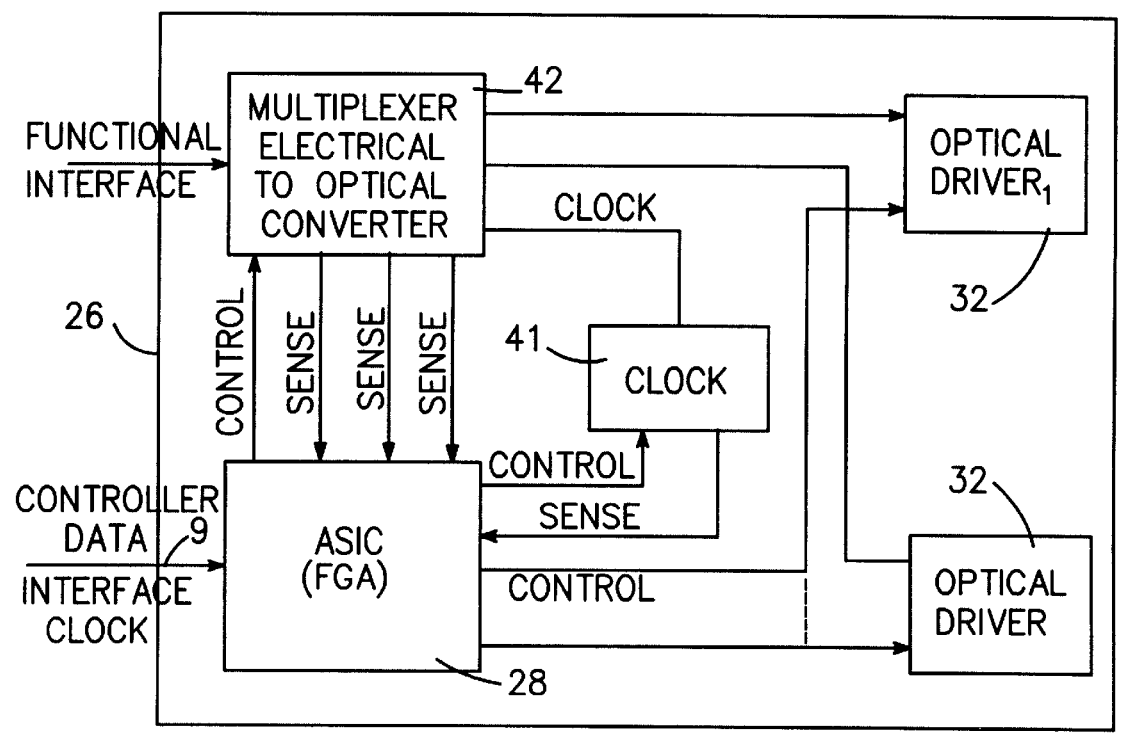
FIG. 2 is a schematic block diagram showing the most essential elements of a prior art I/O circuit used in FIG. 1 showing some more details.
Figure 3:
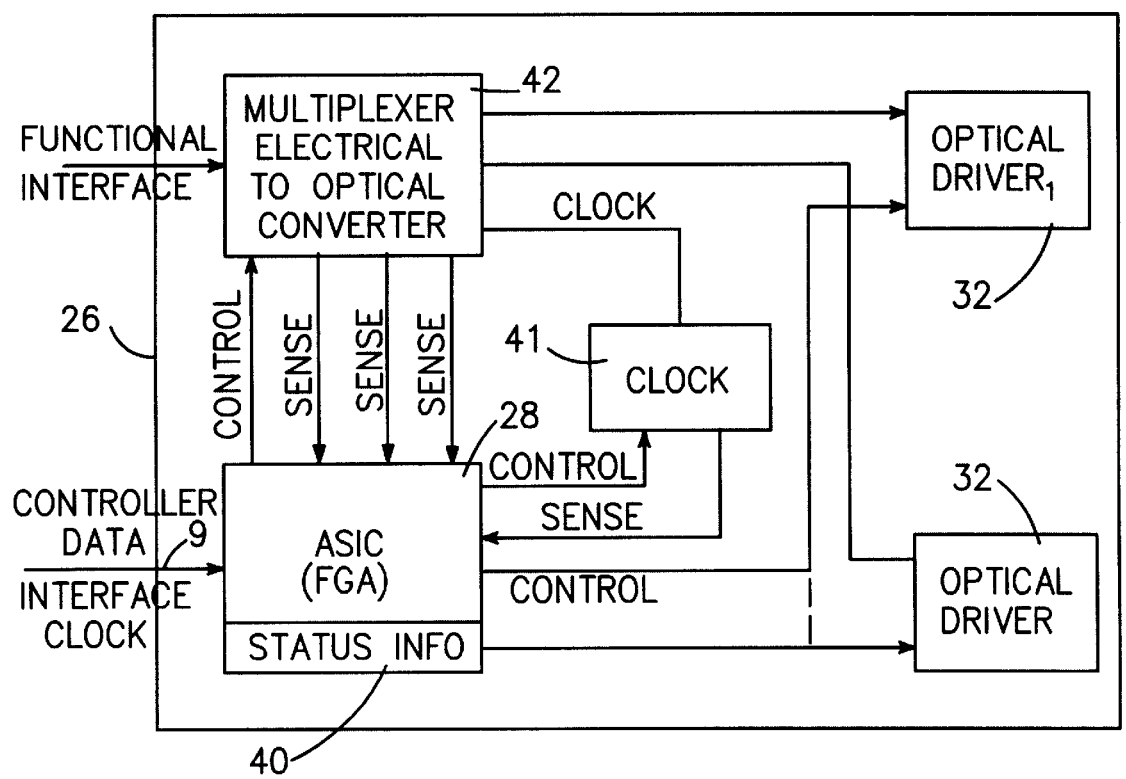
FIG. 3 is a schematic block diagram according to FIG. 2 but disclosing the inventional use of a storage according to a preferred aspect of the inventional method.

With general reference to the figures and with special reference now to FIG. 3 an inventive input/output device 26 is described in more detail. The input/output device 26 comprises a plurality of optical driver devices 32, a clock device 41, an electrical-to-optical multiplexing device 42 which represents the above mentioned sensor response means, a hardware chip device 28 that controls said input/output device 26, and an inventive input/output storage means 40 for storing the above-mentioned status information. The storage means is an input/output register accessible by the operating system of the server, see back to FIG. 1.

In the register storage 40, the ASIC 28 logic repeatedly stores status information of the converter 42. Thus, this information can be used later on when it is requested by a controller via the controller interface which is discussed next below with reference to FIG. 4.

Figure 4:
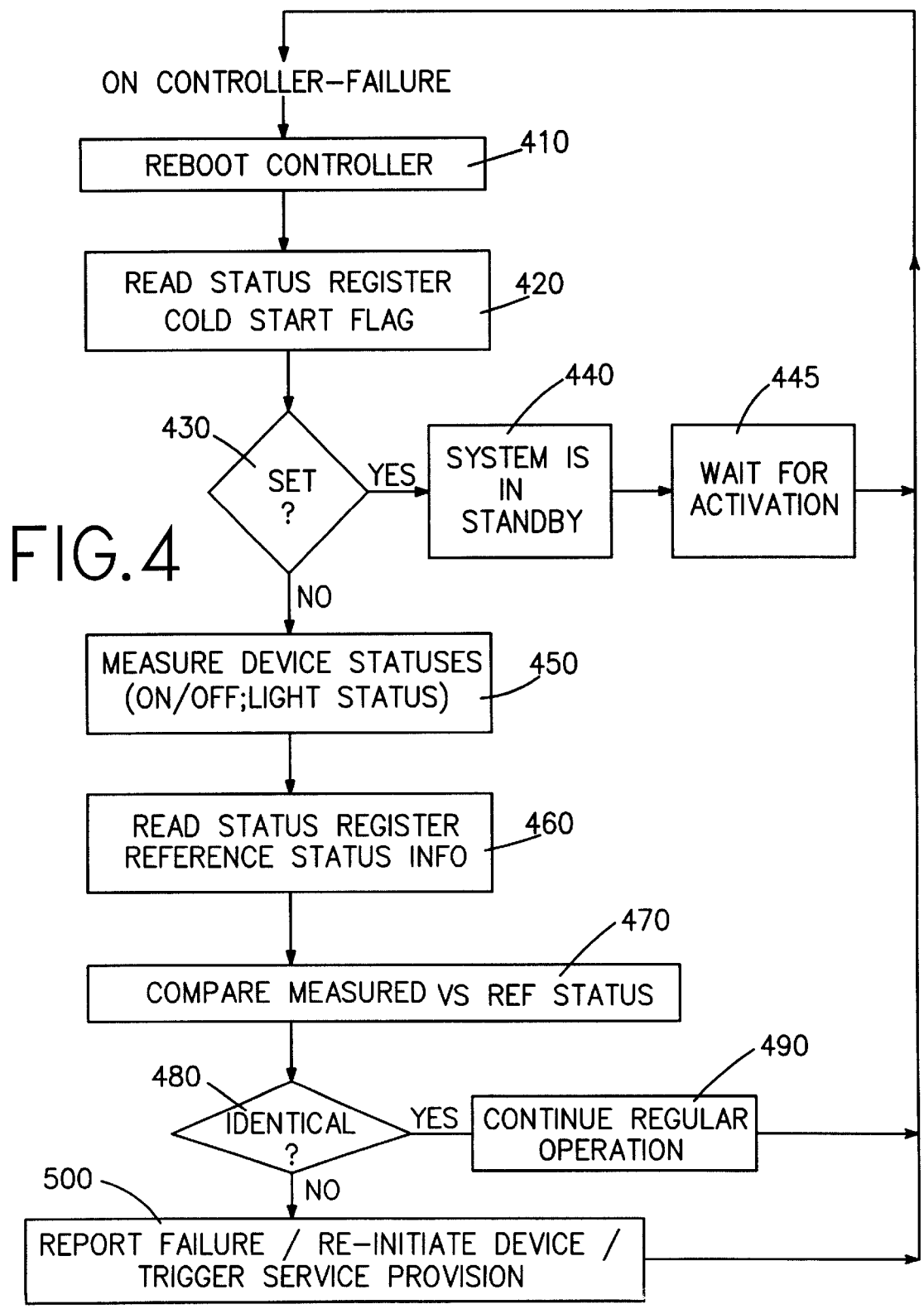
FIG. 4 is a schematical block diagram showing the basic steps and the control flow of an embodiment of the invention.

FIG. 4 is a schematic block diagram showing the basic steps and the control flow of an embodiment of the inventive method. On a failure of the controller means 18, said controller is rebooted at step 410. After the controller 18 has resumed operation, it reads a cold start flag from the register 40 located with the ASIC 28 inside the input/output device circuit 26 at step 420.

If the cold start flag is set to YES, see the YES branch of decision at 430, the system is recognized to be in stand-by status, as depicted at step 440, and waits for activation, i.e., a restart initiated by the controller, at step 445.

If the cold start flag is set to NO, see the NO-branch of decision 430, the status information reflecting the current status of said input/output device 26 is sensed at step 450 into the controller 18.

Then the status information which was already (repeatedly) been stored in the input/output register storage 40 located on the input/output device 26 is read at step 460 and compared, at step 470, to the status information freshly sensed by the controller means 18. This leads to a decision at step 480 of whether the read and the sensed information is identical or not.

If identical results are present, see the YES-Branch of decision 480, and the regular operation of the system is continued, at step 490, meaning that the system continues its operation at the point where the disruption occurred.

Otherwise, along the NO-branch wherein the result of the comparison (at 480) does not yield identical results, then a failure is reported and the input/output device (26) is re-initialized, at step 500, and an optional service can be triggered provide for repairing the breakdown system elements.

Thus, as revealed from the foregoing description, the present invention represents a large step forward to increase the overall system availability in those systems having the specific properties detailed herein.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the client or server specific steps of the methods described herein.

The present invention can also be embedded in a computer program product, which comprises all the features enabling the implementation the respective steps of the methods described herein, and which—when loaded in one or more computer systems—is able to carry out these methods.

Computer program means or computer program in the present context mean any expression, in any language, code or notation, of a set of instructions intended to cause a system having an information processing capability to perform a particular function either directly or after either or both of the following: a) conversion to another language, code or notation; b) reproduction in a different material form.

Having thus described the invention, what is claimed is:

1. A method for operating an input/output circuit in cooperation with a dedicated controller means for driving a plurality of peripheral devices via a sensor response means in the case of controller reboot, comprising the steps of:

initiating the sensor response means to generate a response indicating its current drive status;

reading stored status information from an input/output storage means associated with said input/output circuit;

comparing said sensor response means response with the stored status information; and continuing the operation of said sensor response means based on a favorable compare result.

2. The method according to claim 1, applied within an embedded system.

3. The method according to claim 1 wherein a plurality of controller means are provided, further comprising the step of, in case of failure of a first dedicated controller device, causing a second, redundantly provided controller means to take over the tasks of said first controller means by reading said status information from said input/output storage means.

4. A hardware chip for performing a method for operating an input/output circuit in cooperation with a dedicated controller means for driving a plurality of peripheral devices via a sensor response means in the case of controller reboot, comprising:

initiating component for initiating the sensor response means to generate a response indicating its current drive status;

reading means for reading stored status information from an input/output storage means associated with said input/output circuit; and comparator means for comparing said sensor response means response with the stored status information; wherein the operation of said sensor response means is continued based on a favorable compare result.

5. The hardware chip according to claim 4 wherein said initiating component, said reading component and said comparator means comprise an ASIC.

6. The hardware chip, according to claim 5 wherein said input/output storage comprises at least one register.

7. A printed circuit board comprising a hardware chip for performing a method for operating an input/output circuit in cooperation with a dedicated controller means for driving a plurality of peripheral devices via a sensor response means in the case of controller reboot, said chip comprising:

initiating component for initiating the sensor response means to generate a response indicating its current drive status;

reading means for reading stored status information from an input/output storage means associated with said input/output circuit; and comparator means for comparing said sensor response means response with the stored status information; wherein the operation of said sensor response means is continued based on a favorable compare result.

8. A computer program for execution in a data processing system comprising computer program code portions for performing respective steps for performing a method for operating an input/output circuit in cooperation with a dedicated controller means for driving a plurality of peripheral devices via a sensor response means in the case of controller reboot, said method comprising the steps of:

initiating the sensor response means to generate a response indicating its current drive status;

reading stored status information from an input/output storage means associated with said input/output circuit;

comparing said sensor response means response with the stored status information; and continuing the operation of said sensor response means based on a favorable compare.

9. A program storage device readable by machine tangibly embodying a program of instructions executable by the machine for performing a method for operating an input/output circuit in cooperation with a dedicated controller means for driving a plurality of peripheral devices via a sensor response means in the case of controller reboot, said method comprising the steps of:

initiating the sensor response means to generate a response indicating its current drive status;

reading stored status information from an input/output storage means associated with said input/output circuit;

comparing said sensor response means response with the stored status information; and continuing the operation of said sensor response means based on a favorable compare.

* * * * *